United States Patent
Singleton

(10) Patent No.: US 7,487,137 B2
(45) Date of Patent: Feb. 3, 2009

(54) APPARATUS, SYSTEM, AND METHOD FOR JAVA BEAN DELTA GENERATION

(75) Inventor: Todd Michael Singleton, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 11/205,862

(22) Filed: Aug. 17, 2005

(65) Prior Publication Data
US 2007/0044070 A1  Feb. 22, 2007

(51) Int. Cl.
*G06F 17/30* (2006.01)
*G06F 15/16* (2006.01)

(52) U.S. Cl. .................. 707/1; 707/100; 707/101; 709/206; 717/100

(58) Field of Classification Search ........................ None
See application file for complete search history.

(56) References Cited

U.S. PATENT DOCUMENTS

| | | | |
|---|---|---|---|
| 5,914,679 A | 6/1999 | Burrows | 341/79 |
| 6,256,772 B1* | 7/2001 | Apte et al. | 717/100 |
| 6,298,478 B1 | 10/2001 | Nally et al. | 717/6 |
| 6,389,592 B1* | 5/2002 | Ayres et al. | 717/172 |
| 6,513,040 B1 | 1/2003 | Becker et al. | 707/10 |
| 2003/0028600 A1* | 2/2003 | Parker | 709/206 |
| 2003/0084056 A1* | 5/2003 | DeAnna et al. | 707/100 |
| 2003/0167333 A1* | 9/2003 | Kumar et al. | 709/227 |
| 2004/0039964 A1* | 2/2004 | Russell et al. | 714/25 |
| 2004/0148270 A1* | 7/2004 | McKay et al. | 707/1 |
| 2004/0148301 A1* | 7/2004 | McKay et al. | 707/101 |
| 2004/0148302 A1* | 7/2004 | McKay et al. | 707/101 |
| 2004/0148303 A1* | 7/2004 | McKay et al. | 707/101 |
| 2006/0067252 A1* | 3/2006 | John et al. | 370/261 |
| 2006/0294493 A1* | 12/2006 | Melby | 717/104 |

OTHER PUBLICATIONS

Amy Sundermier, et al. "Delta Objects for JavaBeans: Applying Database Technology to Software Components", http://www.eas.asu.edu/~adood/PUBLICATIONS/delta_beans_paper.html.
DeltaBean Xref. http://jakarta.apche.org/commons/betwixt/xref-test/org/apache/commons/be.../DeltaBean.htm.
Amy Sundermier, et al. "An Active Database Approach to Integrating Black-Box Software Components", 23 Annual International Computer Software and Applications Conference, Oct. 25-26, 1999, p. 403.
Shahram Ghandeharizadeh, et al. "A Case for Deltas in Business-to-Business Electronic Commerce" pp. 1-10.

* cited by examiner

*Primary Examiner*—Tony Mahmoudi
*Assistant Examiner*—Dung K Chau
(74) *Attorney, Agent, or Firm*—Kunzler & McKenzie

(57) ABSTRACT

An apparatus, system, and method are disclosed for generating a delta across like java bean components. The apparatus includes a store module, a comparison module, and a delta module. The store module stores a first java bean on a client. The comparison module compares a second java bean to the first java bean at the client. The second java bean is similar in format to the first java bean. The delta module generates a delta at the client. The apparatus, system, and method improve efficiency of a network system by decreasing network overhead when delta java beans are transmitted in place of the first or second java beans.

14 Claims, 6 Drawing Sheets

APPARATUS, SYSTEM, AND METHOD FOR JAVA BEAN DELTA GENERATION

BACKGROUND

1. Field of Art

This invention relates to java beans and more particularly relates to generating and using a delta across like java bean components.

2. Background Technology

JavaBeans is the name of a component architecture for use with the Java programming language. ("JAVABEANS" and "JAVA" are trademarks of Sun Microsystems, Inc.) A java bean is the java term for a "component," where a component is a reusable building block of application logic that a programmer can combine with other components to form an application program. JavaBeans is an architecture and platform-neutral Application Programming Interface (API) for creating and using dynamic Java components. Java beans enhance the java platform by allowing richer, more dynamic interaction. Java beans allow developers to define independent components that can be used and re-used in a variety of combinations to compose new applications inside a variety of browser and non-browser environments.

A java programmer creates a java application program by assembling components that provide the desired functionality for the application. A java bean may contain code for a relatively simple function such as displaying a button on a graphical user interface (GUI), but it may also contain quite complex code. For example, JavaBeans components can be non-visual functions and services, applets, and more full-scale applications. Each of these components can be built by different developers at separate times. JavaBeans components do not need to be part of the same application build because they are capable of communicating dynamically.

"Enterprise JavaBeans" is a server component architecture which extends the JavaBeans architecture to an enterprise system. "Enterprise" in this sense refers to an organization that uses computers in a networking environment, typically on a very large scale. An enterprise java bean (EJB) is similar to a java bean, with several notable exceptions. Java beans are intended to execute locally, within the java virtual machine (JVM) on which a java application is running. EJBs, on the other hand, are intended to execute on a server machine in a network, where they are remotely invoked by messages sent from a client machine's JVM. Java beans may provide code for visual objects, such as the GUI button discussed above; EJBs are always non-visual.

Both java beans and EJBs differ from "pure" objects in object-oriented programming in that they have a required external interface. This interface is called the "properties" interface. Using this external interface, a development tool can interrogate the java bean or EJB to determine what its component does and how its function is to be invoked by other components. The properties interface also enables developers to customize the behavior of components without having access to the source code. As a simple example, when the component contains code for displaying a button on a GUI, the developer may use a component property to specify the text that should be displayed on the button face.

In large-scale enterprise computing environments, a single server application may serve multiple concurrent client applications, each accessing an overlapping set of EJBs, while other server applications are also accessing the EJBs. A collection of EJBs is stored in a data store, such as a database. These stored EJBs may be accessed concurrently by one or more server application programs. Each server application may have one or more clients that are executing the application at a given time.

One use for java beans, EJBs, or another type of similar component, is to transmit status data from a client to a server. For example, a software program may scan a file system and store certain status data in a first component, which may subsequently be sent to a network server to be stored in a centralized database. At a later time, the software program may scan the file system again and generate a second component that may be sent to the server and stored in the centralized database. However, sending the entire data set of each component every time may require substantial bandwidth and network overhead.

From the foregoing discussion, it should be apparent that a need exists for an apparatus, system, and method that overcome the limitations of conventional network systems that use java beans or other data objects to transmit status data from a client to a server. In particular, such an apparatus, system, and method would beneficially minimize the network overhead consumed by the transfer of the java beans or other data objects.

SUMMARY

The several embodiments of the present invention have been developed in response to the present state of the art, and in particular, in response to the problems and needs in the art that have not yet been fully solved by currently available network systems. Accordingly, the present invention has been developed to provide an apparatus, system, and method for generating a delta across like java components that overcome many or all of the above-discussed shortcomings in the art.

The apparatus to generate a delta across like java components is provided with a logic unit containing a plurality of modules configured to functionally execute the necessary operations for generating a delta across like java components. These modules in the described embodiments include a store module, a compare module, and a delta module. Further embodiments include a transmission module and a generation module.

In one embodiment, the store module stores a first java bean on a client. Additionally, the store module may store a second java bean on the client. The first and second java beans may be one of a variety of types of java beans, including an endpoint bean, a nested bean, a status bean, and so forth. Furthermore, the information within the first and second java beans may include one of a variety of types of members, including a primitive variable, a non-bean object, a nested java bean, and so forth.

In one embodiment, the comparison module compares the second java bean to the first java bean. This comparison occurs at the client. By comparing java beans having similar formats, the comparison may include comparing each member of the second java bean with each corresponding member of the first java bean.

In one embodiment, the delta module generates a delta corresponding to the difference between the first java bean and the second java bean. The delta module generates the delta at the client. In one embodiment, the delta may describe the difference between corresponding members of the first and second java beans. Alternatively, the delta may include the updated information from the second java bean. In one embodiment, the delta module may use reflection to generate the delta. In another embodiment, the delta module may implement recursive delta generation to generate a delta where the first and second java beans include nested java beans.

In one embodiment, the transmission module facilitates transmission of the delta from the client to the server. In one embodiment, the generation module generates the first and second java beans. In certain embodiments, the second java bean may be a temporally subsequent version of the first java bean.

A system of the present invention is also presented to generate a delta across like java components. The system may be embodied in a network system. The network system may include a server, a client, and a delta generator. The client is coupled to the server and the delta generator is coupled to the client. The delta generator generates a delta from the first and second java beans sends the delta from the client to the server.

A signal bearing medium is also presented to store a program that, when executed, performs operations to generate a delta across like java components. In one embodiment, the operations include storing a first java bean on a client, comparing a second java bean to the first java bean at the client, the second java bean similar in format to the first java bean, and generating a delta at the client.

In another embodiment, the operations may include using reflection to generate the delta, facilitating transmission of the delta from the client to a server, and generating the first and second java beans, wherein the second java bean comprises a temporally subsequent instance of the first java bean. In another embodiment, the operation may include implementing recursive delta generation to generate the delta of the first and second java beans, wherein the first and second java beans each comprise a nested java bean. In another embodiment, the delta includes an updated member variable of the second java bean compared to a corresponding member variable of the first java bean.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Figure 1:
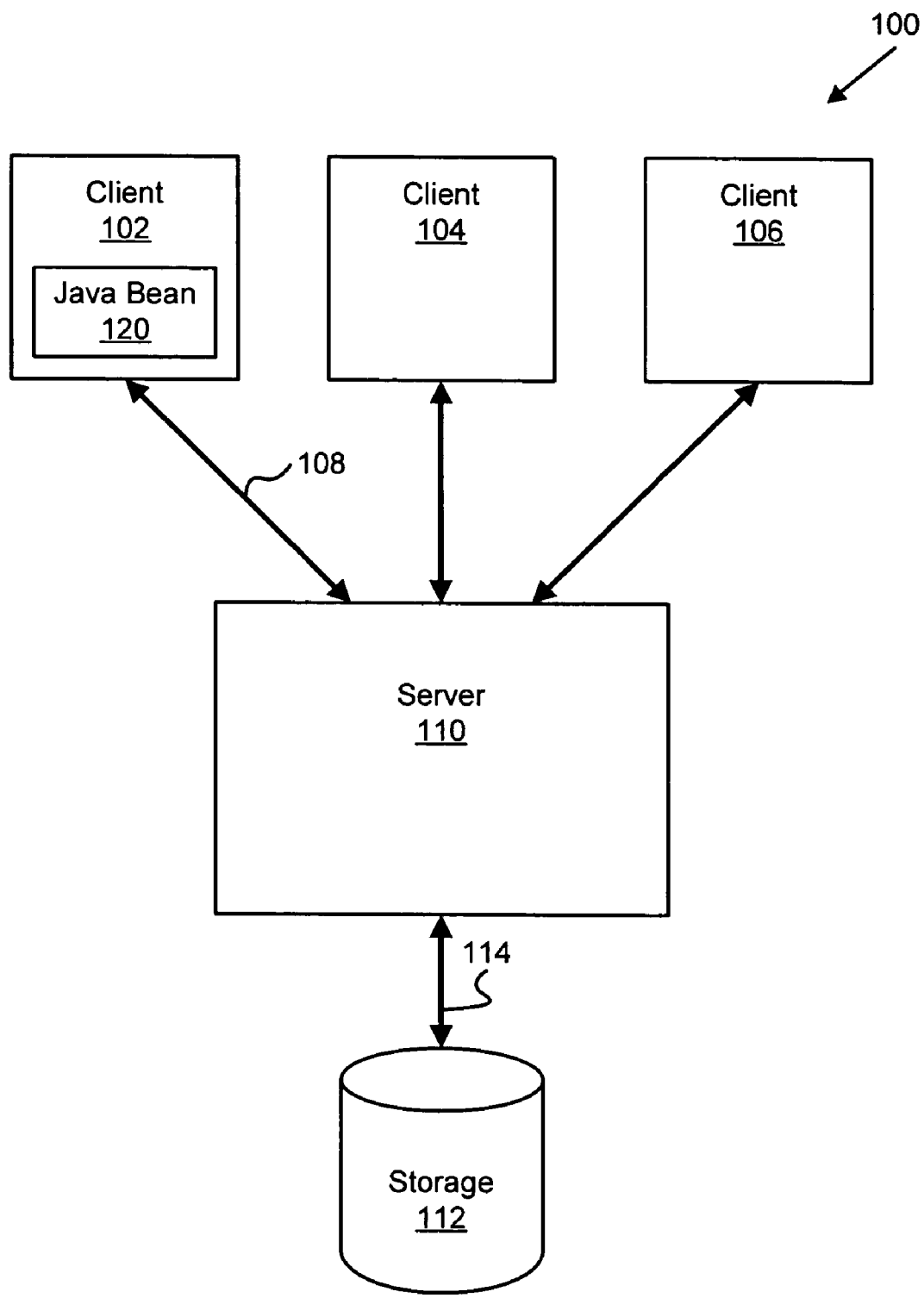
FIG. 1 is a schematic block diagram illustrating one embodiment of a network system.

FIG. 1 depicts one embodiment of a network system 100. The illustrated network system 100 includes multiple clients 102, 104, 106 coupled via one or more communication channels 108 to a server 110. However, the network system 100 may include fewer or more clients 102, 104, 106 than are shown in FIG. 1. References herein to the client 102 refer generally to any client coupled to the server 110, unless indicated otherwise. In turn, the server 110 is coupled to a centralized data storage device 112 via a communication channel 114. The centralized data storage device 112 may include any media type and corresponding drives that are capable of storing data in an electronic, magnetic, or optical manner. In one embodiment, the centralized data storage device 112 includes a database.

As an operation within the network system 100, the client 102 may generate a java bean 120 that is descriptive of the client 102 in one way or another. For example, the java bean 120 may describe the inventory of components currently installed on the client 102. Alternatively, the java bean 120 may describe the operating characteristics of one or more components. For example, the java bean 120 may include the media access control (MAC) address, the hard disk drive (HDD) space, and so forth. In another embodiment, the java bean 120 may describe the health of an application running on the client 102 or the health of a component on the client 102. In further embodiments, the java bean 120 may be descriptive of a combination of this exemplary information and/or other information.

After generating the java bean 120, the client 102 may communicate the java bean 120 to the server 110, which may store the java bean 120 on the centralized data storage device 112. Additionally, the server 110 may access the data within the java bean 120 so as to use the information to assess the condition of the client 102, in one manner or another.

Figure 2:
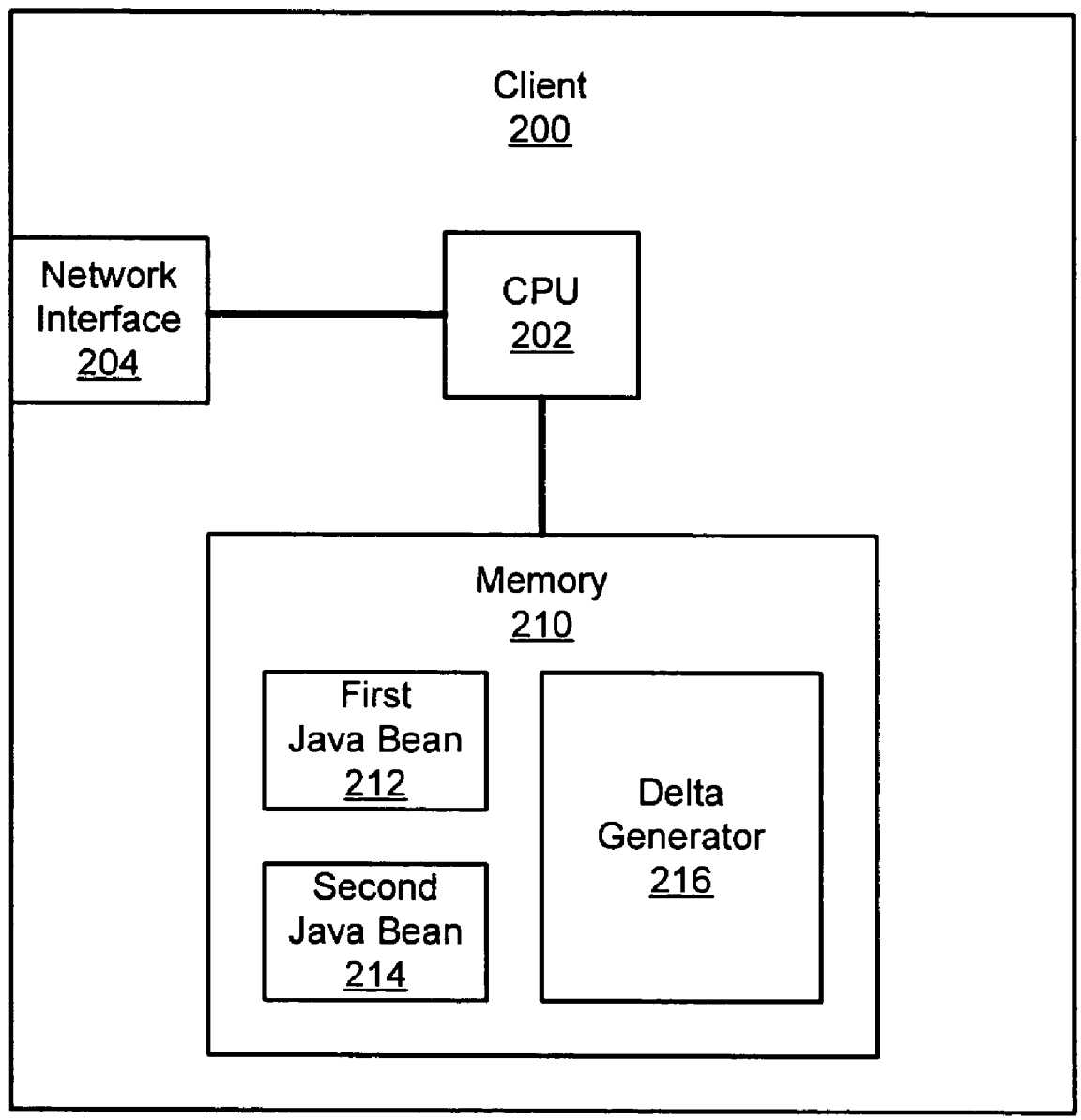
FIG. 2 is a schematic block diagram illustrating one embodiment of a client.

FIG. 2 depicts one embodiment of a client 200 that is substantially similar to the client 102 of the system 100 of FIG. 1. The illustrated client 100 includes a central processing unit (CPU) 202, a network interface 204, and an electronic memory device 210. Other embodiments of the client 200 may include fewer or more components, especially commonly known components that may be currently available and/or used in clients 200 within a network system 100.

The CPU 202 processes operational and file data within the client 200 so as to communicate data within the client 200 and allow the client 200 to operate according to any control instructions on the client 200. The network interface 204 is a physical connection that couples the client 200 to the communication channel 108 and allows the client 200 to communicate with the server 110 or other components within the network system 100.

In one embodiment, the electronic memory device 210 stores a first java bean 212 and a second java bean 214 that are substantially similar to the java bean 120 described above with reference to FIG. 1. However, in a particular embodiment, the first java bean 212 and the second java bean 214 are temporally sequential java beans, meaning that they contain similar information about the client 200 at different times. In other words, the first java bean 212 contains certain information about the client 200 at a first time and the second java bean 214 contains information about the client 200 at a second time that is different from the first time. For example, the first java bean 212 may correspond to day one and the second java bean 214 may correspond to day two.

The illustrated electronic memory device 210 also includes a delta generator 216. The delta generator 216 is generally capable of determining a delta based on the first java bean 212 and second java bean 214. A delta is a representation of one or more differences between the first java bean 212 and second java bean 214. One example of the delta generator 216 is shown and describe in more detail with reference to FIG. 3.

Figure 3:
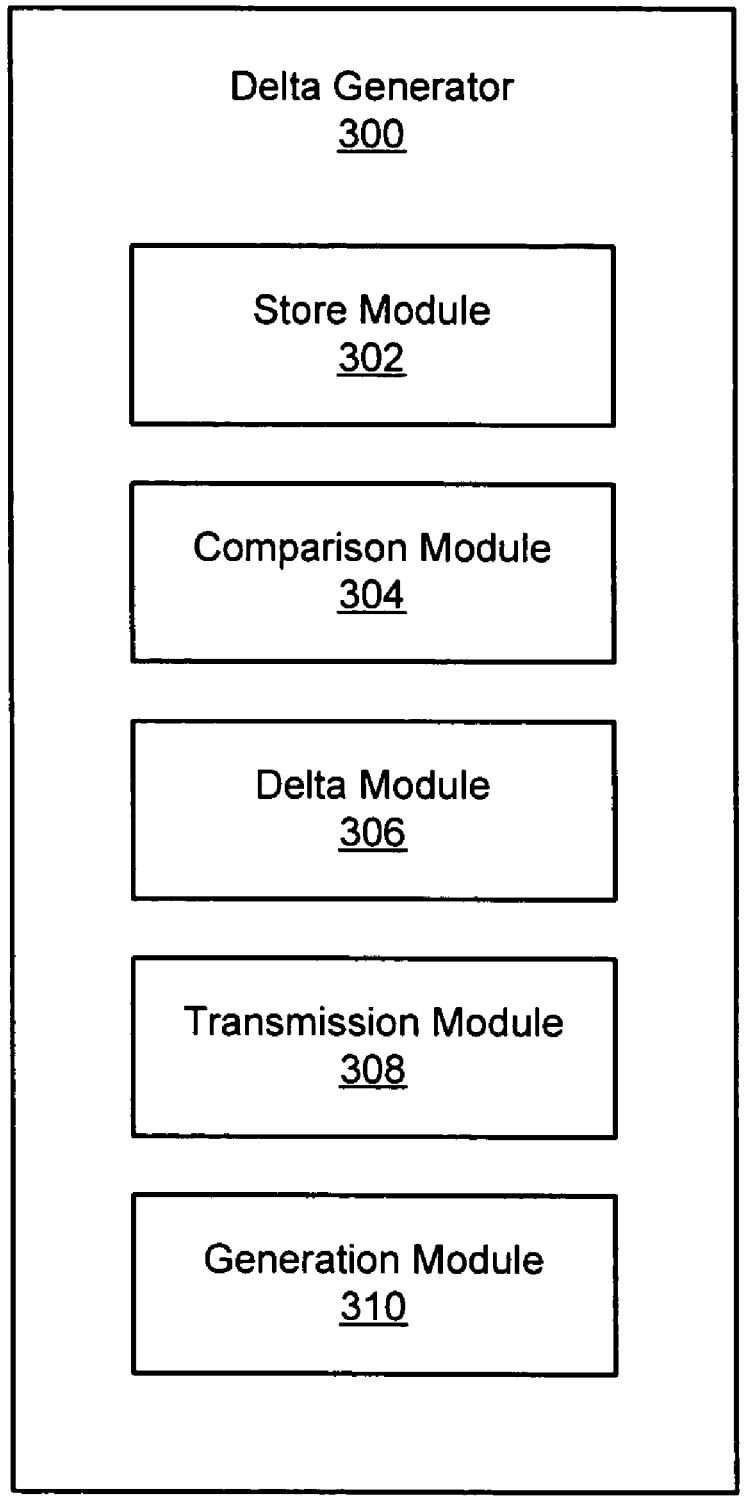
FIG. 3 is a schematic block diagram illustrating one embodiment of a delta generator apparatus.

FIG. 3 depicts one embodiment of a delta generator apparatus 300 that is substantially similar to the delta generator 216 of FIG. 2. The illustrated delta generator apparatus 300 includes a store module 302, a comparison module 304, a delta module 306, a transmission module 308, and a generation module 310. However, other embodiments of the delta generator 300 may include fewer or more modules than are shown in FIG. 3.

In one embodiment, the store module 302 stores the first java bean 212 on the client 200. Additionally, the store module 302 may store the second java bean 214 on the client 200. The first and second java beans 212, 214 may be one of a variety of types of java beans, including an endpoint bean, a nested bean, a status bean, and so forth. An endpoint bean is a java bean that corresponds to an endpoint, such as a client 102, within the network system 100. A nested bean is a java bean that includes one or more java beans within the nested bean. In other words, a java bean is a nested bean if it contains another java bean as one of its members. A status bean is a java bean that indicates a status of the corresponding client 200. Furthermore, the information within the first and second java beans 212, 214 may include one of a variety of types of members, including primitive variables, non-bean objects, nested java beans, and so forth.

In one embodiment, the comparison module 304 compares the second java bean 214 to the first java bean 212. This comparison occurs at the client 200. By comparing java beans 212, 214 having similar formats, the comparison may include comparing each member of the second java bean 214 with each corresponding member of the first java bean 212.

In one embodiment, the delta module 306 generates a delta corresponding to the difference between the first java bean 212 and the second java bean 214. The delta module 306 generates the delta at the client 200. In one embodiment, the delta may describe the difference between corresponding members of the first and second java beans 212, 214. Alternatively, the delta may include the updated information from the second java bean 214. In other words, where the second java bean 214 contains data in a member variable that is different from data in a corresponding member variable of the first java bean 212, the delta may include only the data from the second java bean 214. In contrast, where the data from the first and second java beans 212, 214 are the same, the delta may include an identifier that indicates that the data has not changed from the first java bean 212 to the second java bean 214.

In one embodiment, the delta module 306 may use reflection to generate the delta. Reflection is self-describing—it allows an application to query its own metadata in order to determine information about itself. In another embodiment, the delta module 306 may implement recursive delta generation to generate a delta where the first and second java beans 212, 214 include nested java beans. In other words, the delta module 306 may establish a delta for each level of a nested java bean and aggregate the nested deltas to form the overall delta for the nested bean.

In one embodiment, the transmission module 308 facilitates transmission of the delta from the client 200 to the server 110. As described above, the client 200 may communicate the delta to the server 110 via the communication channel 108.

In one embodiment, the generation module 310 generates the first and second java beans 212, 214. As described above, the second java bean 214 may be a temporally subsequent version of the first java bean 212.

Figure 4:
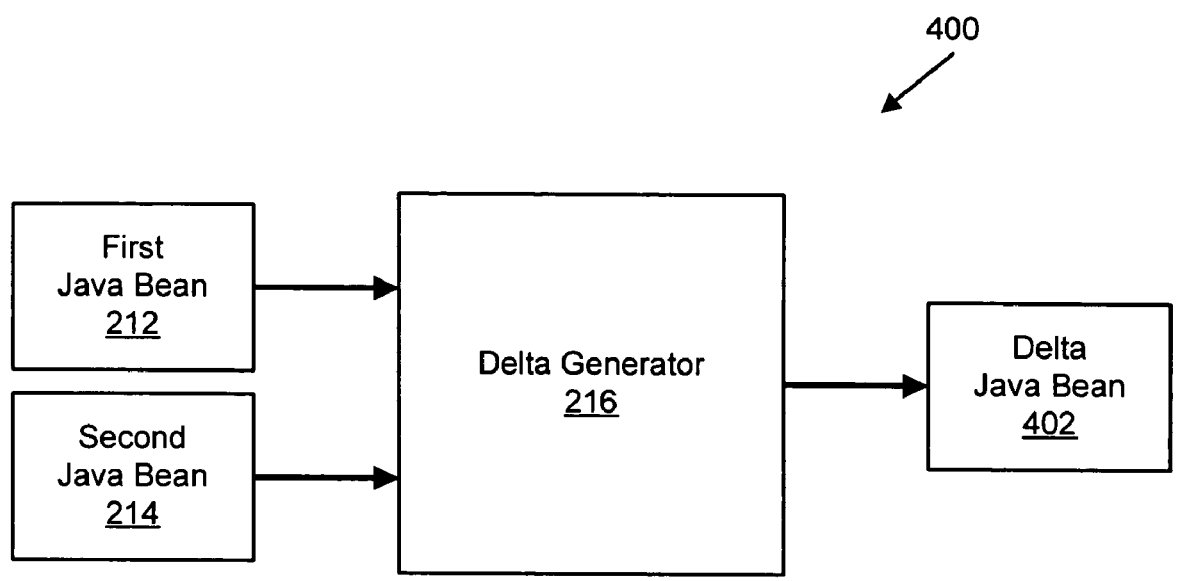
FIG. 4 is a schematic data flow diagram illustrating one embodiment of a delta generation process.

FIG. 4 depicts one embodiment of a delta generation process 400. The delta generation process 400 illustrates how the delta generator 216 generates a delta java bean 402. The delta generator 216 takes as inputs both the first java bean 212 and the second java bean 214. By performing some or all of the operations performed by the modules 302-310 describe above, the delta generator 216 produces the delta in the form of a delta java bean 402. In one embodiment, the delta bean 402 has a format that is similar to the first and second java beans 212, 214. As described above, the delta bean 402 may include, in one embodiment, only the data of the second java bean 214 that differs from the data of the first java bean 212. However, in alternative embodiments, the delta bean 402 may have other formats and/or contents.

Figure 5:
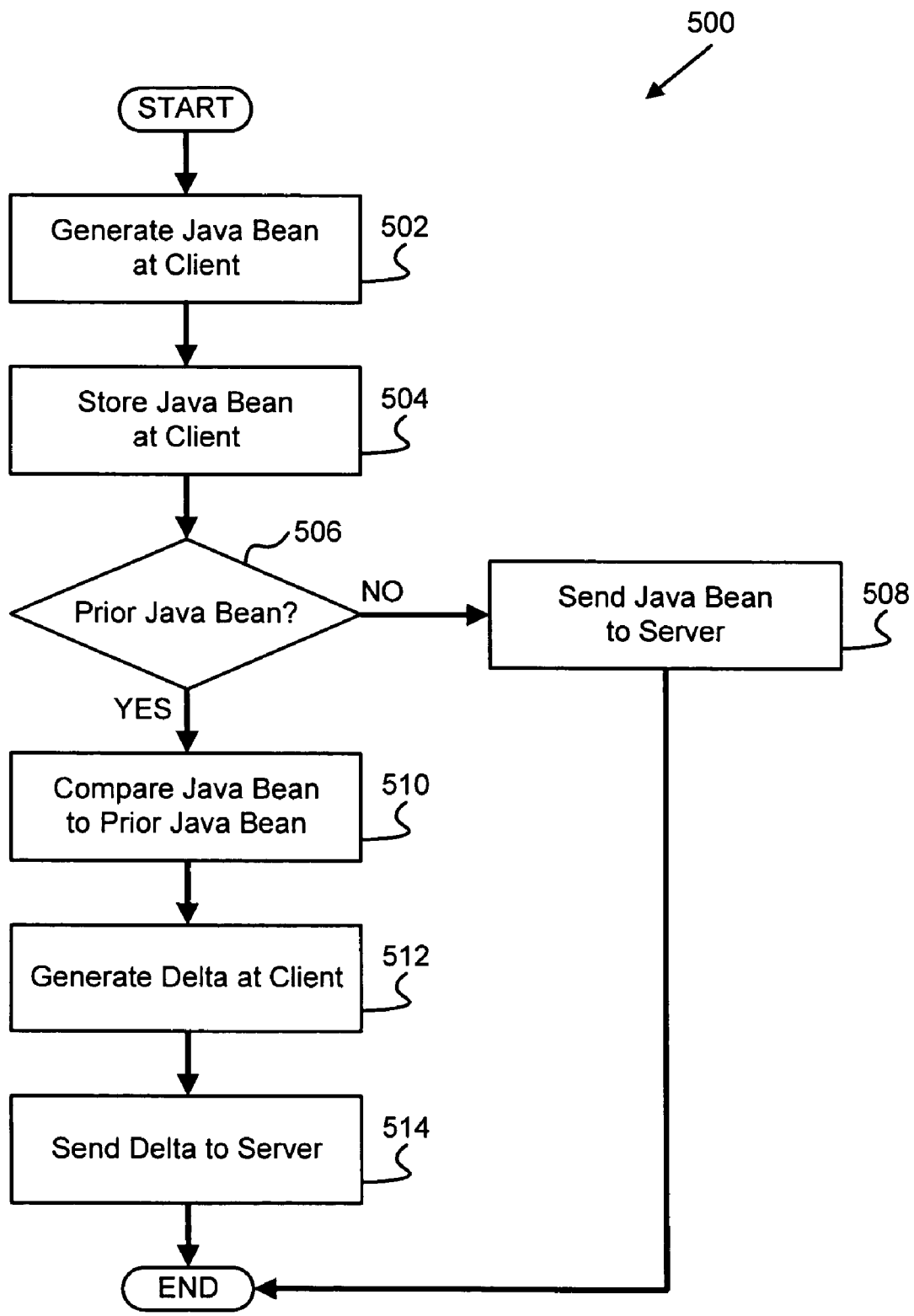
FIG. 5 is a schematic flow chart diagram illustrating one embodiment of a delta method.

FIG. 5 depicts one embodiment of a delta method 500. The delta method 500 may be performed, at least in part, by the delta generator 216 described above. The illustrated delta method 500 begins and the generation module 310 generates 502 a java bean 120 at the client 102. The store module 302 then stores 504 the java bean 120 at the client 102. If there are no prior java beans 120 of similar format and content on the client 102, then this java bean 120 is a first java bean 212. However, if there is a prior java bean 120 of similar format and content on the client 102, then this java bean 120 is a second java bean 212. As can be seen, the designation of "first" and "second" is simply a convention for identifying sequential java beans 120.

If the delta generator 300 determines 506 that the java bean 120 is a first java bean 212 and there is not a prior java bean 120 on the client 200, the transmission module 308 sends 508 the first java bean 212 to the server 110. In contrast, if the delta generator 300 determines 506 that the java bean 120 is a second java bean 214 and there is a prior java bean on the client 200, the comparison module 304 compares 510 the second java bean 214 to the prior, first java bean 212. One example of the comparison operation 510 is shown and described in more detail with reference to FIG. 6.

The delta module 306 then generates 512 a delta bean 402 based on the comparison of the first and second java beans 212, 214. Then the transmission module 308 sends 514 the delta bean 402 to the server 110. In another embodiment, if the first and second java beans 212, 214 are the same (i.e., the members of the second java bean 214 are not updated compared to the members of the first java bean 212), then the delta method 500 may potentially omit one or both of the generation operation 512 and transmission operation 514. After transmitting 508 the first java bean 212 or transmitting 514 the delta bean 402, the depicted delta method 500 then ends.

Figure 6:
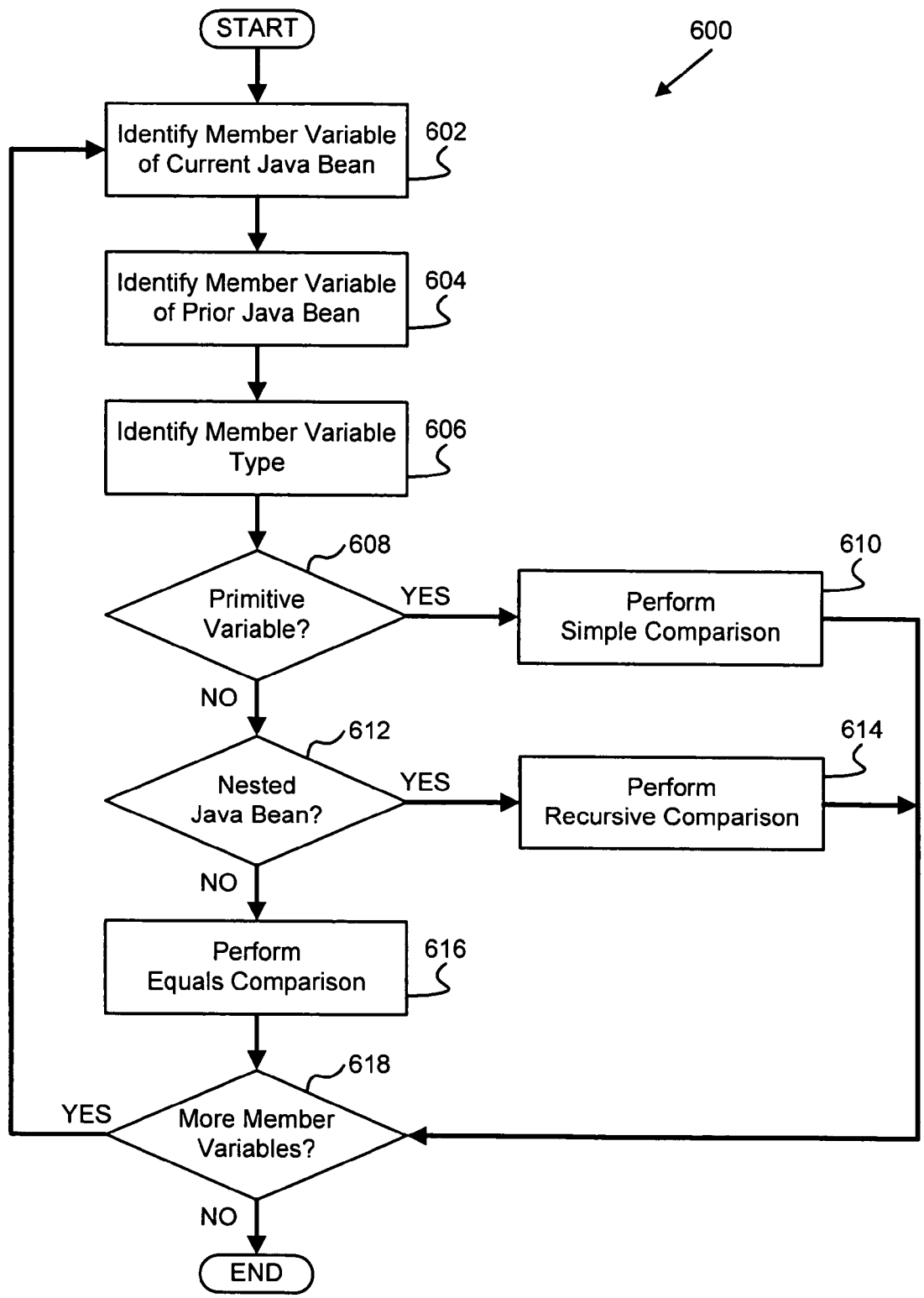
FIG. 6 is a schematic flow chart diagram illustrating one embodiment of a comparison method.

FIG. 6 depicts one embodiment of a comparison method 600. The comparison method 600 may be performed, at least in part, by the comparison module 304 of the delta generator 300. The illustrated comparison method 600 begins and the comparison module 304 identifies 602 a member variable of the current, or second, java bean 214. The comparison module 304 then identifies 604 a member variable of the prior, or first, java bean 212. Although the first java bean 212 corresponds to the prior java bean and the second java bean 214 corresponds to the current java bean in this example, the terms first and second are arbitrary and are not specifically related to the relative times at which each of the java beans 120 is generated.

After identifying 602, 604 corresponding member variables of the first and second java beans 212, 214, the comparison module 304 identifies 606 the member variable type of those member variables. As described above, some of the exemplary member variable types include primitive variables, non-bean objects, and nested beans.

If the comparison module 304 determines 608 that the member variables are primitive variables, the comparison module 304 may compare 610 the member variables using a simple comparison. Alternatively, if the comparison module 304 determines 612 that the member variables are nested java beans, the comparison module 304 may compare 614 the member variables using a recursive comparison. In one embodiment, the recursive comparison includes identifying all of the levels of nested beans and then comparing the members of each bean at each level until all of the levels have been compared. If the member variables are neither primitive variables nor nested java beans, the comparison module 304 may compare 616 the member variables using an equal comparison. In further embodiments, the comparison module 304 may perform other types of comparisons in addition to, or in place of, the comparisons described above.

After comparing one set of corresponding member variables, the comparison module 304 may determine 618 if there are additional member variables to be compared from the first and second java beans 212, 214. If so, the comparison module 304 iteratively returns to the identification operations described above. Once all of the member variables have been compared, the depicted comparison method 600 then ends.

The schematic flow chart diagrams included herein are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to generate a delta across like java bean components, the apparatus comprising a CPU;
   a memory storage device of a client in communication with the CPU;

a store module configured to store a first java bean on the memory storage device of a client;

a comparison module coupled to the store module, the comparison module configured to compare a second java bean to the first java bean at the client, the second java bean similar in format to the first java bean, each of the first and second java beans configured as a status java bean to indicate a status of the client with content inclusive of at least one of a primitive variable, a non-bean object, and a nested java bean; and a delta module coupled to the comparison module, the delta module configured to generate a delta from the first java bean and the second java bean at the client by identifying member variables of the first and second java beans, identifying a member variable type, performing a simple comparison of primitive variables of the first and second java beans if the member variable type is a primitive variable type, performing a recursive comparison of nested java beans of the first and second java beans if the member variable type is the nested java bean type, and performing an equal comparison on non-bean objects of the first and second java beans if the member variable type is not the primitive variable type and the nested java bean type.

2. The apparatus of claim 1, wherein the delta module is further configured to use reflection to generate the delta.

3. The apparatus of claim 1, further comprising a transmission module coupled to the delta module, the transmission module configured to facilitate transmission of the delta from the client to a server.

4. The apparatus of claim 1, further comprising a generation module coupled to the store module, the generation module configured to generate the first and second java beans, wherein the second java bean comprises a temporally subsequent instance of the first java bean.

5. The apparatus of claim 1, wherein the first java bean comprises an endpoint bean.

6. The apparatus of claim 1, wherein the first and second java beans each comprise a nested java bean.

7. The apparatus of claim 6, wherein the delta module is further configured to implement recursive delta generation to generate the delta of the first and second java beans comprising nested java beans.

8. A system to facilitate delta generation across like java bean components, the system comprising:
    a server;
    a client coupled to the server; and
    a memory storage device coupled to the client, the memory storage device to store a first java bean and a second java bean, the second java bean similar in format to the first java bean, each of the first and second java beans configured as a status java bean to indicate a status of the client with content inclusive of at least one of a primitive variable, a non-bean object, and a nested java bean a delta generator coupled to the client, the delta generator configured to generate a delta from the first java bean and the second java bean by identifying member variables of the first and second java beans, identifying a member variable type, performing a simple comparison of primitive variables of the first and second java beans if the member variable type is a primitive variable type, performing a recursive comparison of nested java beans of the first and second java beans if the member variable type is the nested java bean type, and performing an equal comparison on non-bean objects of the first and second java beans if the member variable type is not the primitive variable type and the nested java bean type and to send the delta from the client to the server.

9. The system of claim 8, wherein the delta generator uses reflection to determine the member variable type of a common member variable of the first and second java beans.

10. A program of executable code stored on a semiconductor device and executed by a processor to perform operations to generate a delta across like java bean components, the operations comprising:
    storing a first java bean on a memory storage device of a client;
    comparing a second java bean to the first java bean at the client, the second java bean similar in format to the first java bean, each of the first and second java beans configured as a status java bean to indicate a status of the client with content inclusive of at least one of a primitive variable, a non-bean object, and a nested java bean; and
    generating a delta from the first java bean and the second java bean at the client by identifying member variables of the first and second java beans, identifying a member variable type, performing a simple comparison of primitive variables of the first and second java beans if the member variable type is a primitive variable type, performing a recursive comparison of nested java beans of the first and second java beans if the member variable type is the nested java bean type, and performing an equal comparison on non-bean objects of the first and second java beans if the member variable type is not the primitive variable type and the nested java bean type.

11. The program of claim 10, further comprising an operation to use reflection to generate the delta.

12. The program of claim 10, further comprising an operation to facilitate transmission of the delta from the client to a server.

13. The program of claim 10, further comprising an operation to generate the first and second java beans, wherein the second java bean comprises a temporally subsequent instance of the first java bean.

14. The program of claim 10, wherein the delta comprises an updated member variable of the second java bean compared to a corresponding member variable of the first java bean.

* * * * *